US012804792B2

(12) United States Patent
Shashurin

(10) Patent No.: US 12,804,792 B2
(45) Date of Patent: Nov. 17, 2026

(54) ATMOSPHERIC-PRESSURE MICROWAVE PLASMA TORCH

(71) Applicant: Purdue Research Foundation, West Lafayette, IN (US)

(72) Inventor: Alexey Shashurin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 49 days.

(21) Appl. No.: 19/183,853

(22) Filed: Apr. 19, 2025

(65) Prior Publication Data

US 2025/0358924 A1 Nov. 20, 2025

Related U.S. Application Data

(60) Provisional application No. 63/648,047, filed on May 15, 2024.

(51) Int. Cl.
*H05H 1/30* (2006.01)
*H01P 1/38* (2006.01)

(52) U.S. Cl.
CPC ................. *H05H 1/30* (2013.01); *H01P 1/38* (2013.01)

(58) Field of Classification Search
CPC ........... H05H 1/30; H05H 1/4622; H01P 1/38
See application file for complete search history.

(56) References Cited

U.S. PATENT DOCUMENTS

| | | | | |
|---|---|---|---|---|
| 11,273,319 | B2 * | 3/2022 | De Taboada | A61N 5/0613 |
| 2018/0130638 | A1 * | 5/2018 | Ahmad | H01J 37/32229 |

FOREIGN PATENT DOCUMENTS

| | | | | |
|---|---|---|---|---|
| CN | 111491437 A | * 8/2020 | | H05H 1/461 |
| CN | 107801286 B | * 3/2024 | | H05H 1/2406 |

OTHER PUBLICATIONS

Marschall et al., Oxidation of ZrB2—SiC Ultrahigh-Temperature Ceramic Composites in Dissociated Air Journal of Thermophysics and Heat Transfer, 23, 267 (2009).

Owens et al., Development of a 30 kW Inductively Coupled Plasma Torch Facility for Aerospace Material Testing, 10th AIAA/ASME Joint Thermophysics and Heat Transfer Conference, AIAA 2010-4322 (2010).

Macdonald et al., Measurements of Air Plasma/Ablator Interactions in an Inductively Coupled Plasma Torch, Journal of Thermophysics and Heat Transfer 29, 12 (2015).

Webpage, The World Leader in Induction Plasma Technology, (https://www.tekna.com/icp-technology ) 2024.

(Continued)

*Primary Examiner* — Abdullah A Riyami
*Assistant Examiner* — Syed M Kaiser
(74) *Attorney, Agent, or Firm* — Piroozi-IP, LLC

(57) ABSTRACT

A microwave plasma torch (MPT) systems includes a microwave generator configured to generate microwave at a predetermined wavelength into a waveguide, a circulator coupled to the microwave generator and configured to route reflected power in the waveguide away from the microwave generator, a tuner coupled to the circulator and based on a signal representing reflected power in the waveguide configured to reduce the reflected power, a torch section having an igniter and a gas inlet and configured to release plasma, and a sliding short terminating the waveguide and configured to affect the reflected power within the waveguide.

20 Claims, 5 Drawing Sheets

(56) References Cited

OTHER PUBLICATIONS

Webpage, Empowering Futyre Innovations with Plasma Technologies, (https://www.plasmacombustion.com/product-torches.html), 2025.
Uhm et al., A microwave plasma torch and its applications Plasma Sources Sci. Technol. 15, S26 (2006).

* cited by examiner

ATMOSPHERIC-PRESSURE MICROWAVE PLASMA TORCH

CROSS-REFERENCE TO RELATED APPLICATIONS

The present non-provisional patent application is related to and claims the priority benefit of U.S. Provisional Patent Application Ser. 63/648,047, filed May 15, 2024, the contents of which are hereby incorporated by reference in its entirety into the present disclosure.

STATEMENT REGARDING GOVERNMENT FUNDING

None.

TECHNICAL FIELD

The present disclosure generally relates to a system and method of generating extremely hot gaseous environment that can be identified as a flame or plasma torch, and in particular relates to microwave plasma torch systems and methods of generating plasma thereby.

BACKGROUND

This section introduces aspects that may help facilitate a better understanding of the disclosure. Accordingly, these statements are to be read in this light and are not to be understood as admissions about what is or is not prior art.

There are myriad applications in atmospheric pressure plasma sources which may include cases requiring plasmas to be exposed directly to the open air. The example of such applications include waste processing, biomass gasification, fuel reformation, metallurgical, coating, heating, melting, cleaning, enabling synthesis of new materials, microwave heating for fusion reactors, welding and bonding, thermo-mechanical testing of hypersonic materials, localized heating of gas flow in supersonic nozzles, etc.

Plasma torches generally generate and provide high temperature directed flows of plasma. Two main types of plasma torches are induction plasma torches and microwave plasma torches. Although there are several distinct differences between these two types of torches, they both provide high temperature plasmas.

Developments for hypersonic vehicles and propulsions systems find applications from defense to ballistic re-entry of spacecraft. Hypersonic systems, due to the harsh operating environments, encounter several challenges in their design and testing. A key obstacle in the development of hypersonic systems is the thermal protection system and materials, which is necessary for withstanding their operational environments. Developments in the thermal protection materials are critical to improving the life expectancy and function of hypersonic systems. Ground test facilities that replicate the conditions of hypersonic flight are limited by the high stagnation temperature and pressure. Innovative testing methods that can produce the relevant environments that mimicking those in hypersonic flight are crucial for testing and improving thermal protection materials.

Microwave plasma torches (MPTs) are waveguide-based systems that produce a high temperature plasma jet. These devices are electrodeless in design, and generate discharges by creating high electric field intensities by the coupling of the hollow waveguide and coaxial lines that open to atmosphere. In addition to hypersonic vehicle propulsion system applications, MPTs have been used extensively in applications involving hydrocarbon gas processing, carbon nanotube generation, and the abatement of the fluorinated gases. MPT systems are experimentally flexible. These systems have high efficiency compared to RF plasma torches referring to the fact that microwave systems operate at substantially higher frequencies (from few to 100s of GHz). This allows preventing the reflection from relatively rarified plasma layers and enables delivery of the microwave power to denser plasma core. The typical plasma torch temperature is in the range of 5000-10000 K, with a diameter of the order of 1 cm governed by the power level of the microwave system. The microwave plasma torch is a tunable device and the values for plasma torch temperature and size can be adjusted. MPTs are beneficial for obtaining non-contaminated gas stream and higher efficiencies and temperatures over currently utilized arc heaters and inductively coupled plasma torches.

However, given the high energy levels associated with plasma generation in an MPT application, and coupled with issues associated with reflection in a waveguide, even a small amount of reflection can be deleterious. For example, suppose a 3000 Watt microwave power source is considered for plasma, and as little as 10% of this power is reflected in the waveguide, resulting in absorption of 300 Watts by the microwave power source. Such a reflection condition would result in a significant damage to microwave power source (or triggering its protection circuit).

There is an unmet need for a novel system and method to generate plasma jets of extremely high temperature and reduce reflection in waveguides associated with microwave plasma torch systems.

SUMMARY

A microwave plasma torch (MPT) systems is disclosed which includes a microwave generator configured to generate microwave at a predetermined wavelength into a waveguide, a circulator coupled to the microwave generator and configured to route reflected power in the waveguide away from the microwave generator, a tuner coupled to the circulator and based on a signal representing reflected power in the waveguide configured to reduce the reflected power, a torch section having an igniter and a gas inlet and configured to release plasma, and a sliding short terminating the waveguide and configured to affect the reflected power within the waveguide.

A method of generating microwave-based plasma using a microwave plasma torch (MPT) systems is also disclosed. The method includes generating microwave by a microwave generator configured to generate microwave at a predetermined wavelength into a waveguide, routing reflected power in the waveguide away from the microwave generator with a circulator coupled to the microwave generator, tuning microwave within the waveguide with a tuner coupled to the circulator based on a signal representing reflected power in the waveguide, wherein the tuner is configured to reduce the reflected power, releasing plasma to atmosphere from a torch section having an igniter and a gas inlet, and affecting the reflected power within the waveguide with a sliding short terminating the waveguide.

DETAILED DESCRIPTION

Figure 1:
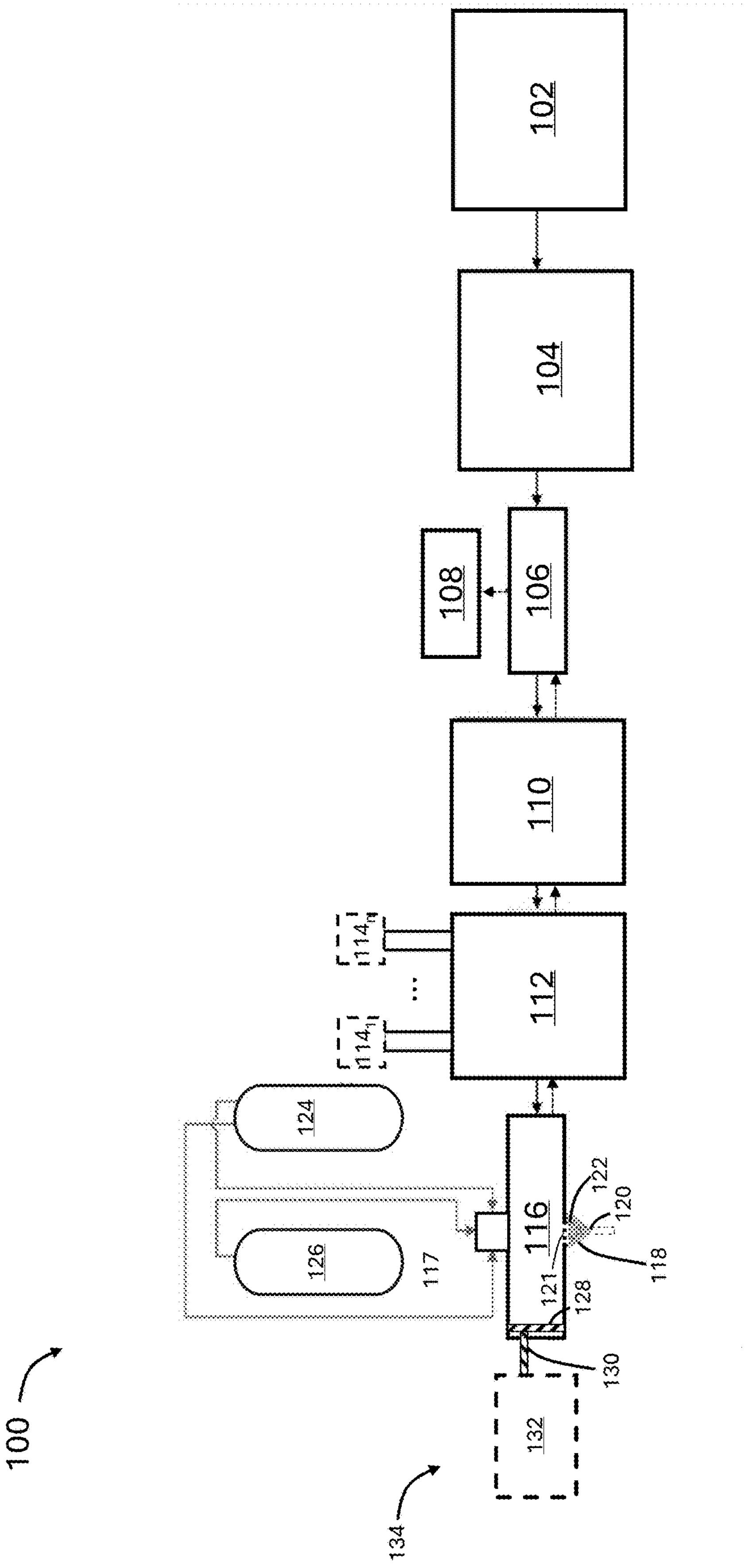
FIG. 1 is a block diagram schematic of the components involved in the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 15%, within 10%, within 5%, or within 1% of a stated value or of a stated limit of a range.

In the present disclosure, the term "substantially" can allow for a degree of variability in a value or range, for example, within 85%, within 90%, within 95%, or within 99% of a stated value or of a stated limit of a range.

A novel system and method are provided in the present disclosure to effectively couple microwave power generated by a source into heating of gas flow. Towards this end, a Microwave plasma torch (MPT) according to the present disclosure is developed for microwave plasma torch systems applications in conditions mimicking those in hypersonic flight. The MPT is experimentally characterized for the plasma torch size, temperature distribution, and system test lifetime. The MPTs of the present disclosure would be used to replicate the hypersonic temperature and composition environment for the testing and development of thermal protection materials. The high temperature plasma jet of the MPT can produce temperatures in excess of 2000 K, which encompasses temperature relevant to the hypersonic vehicles. Using the MPT, a tested material sample is impinged by the high temperature torch, providing a high temperature and ionized testing environment. The MPT of the present disclosure provides a cost-effective solution of producing a hypersonic environment. An adequate water cooling can be used to prevent the excessive heat flux to the sample holding grips from causing damage to the rig.

Figure 2:
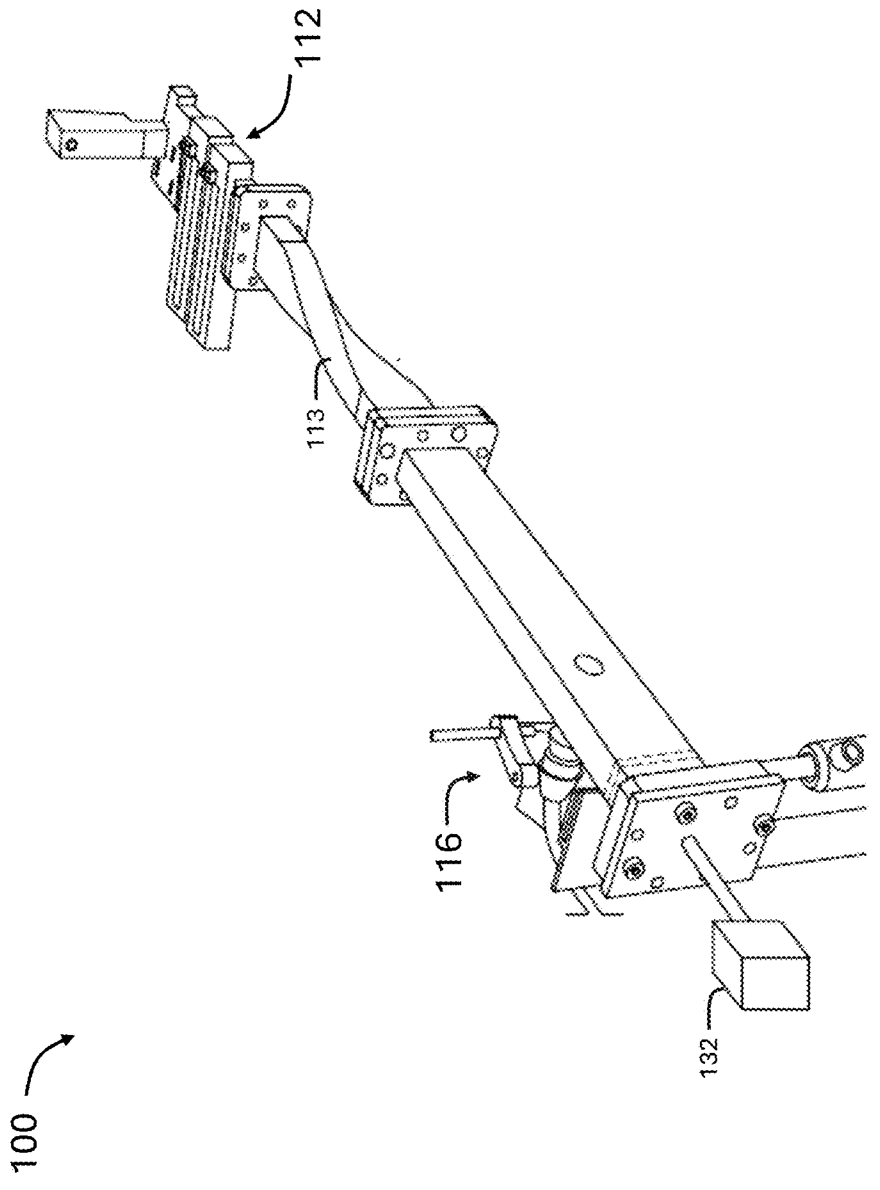
FIG. 2 is a schematic showing some of the components of FIG. 1.

The microwave plasma torch used a design based on rectangular waveguide with a dielectric (quartz) tube configuration for the plasma jet. Referring to FIGS. 1 and 2, a block diagram schematic (FIG. 1) and a perspective view schematic (FIG. 2) of the experimental setup for the MPT system according to the present disclosure are provided. Generally, output of a microwave generator is amplified using an amplifier and the amplified microwave is delivered to a torch section using a waveguide system. A straight copper waveguide is used in the system as a discharge section (containing the torch section). The torch section contains a hole (typically, about 1.5 to about 2.5 cm in diameter) in which a quartz tube containing the plasma discharge is installed, allowing the generated plasma to be discharged. Gas is fed through the quartz tube (swirling and axial flows are used; the swirling flow is used to prevent overheating of the quartz tube walls). The Torch Section is ignited using a spark generator, either manually or by use of an articulating arm, whereby the arm removes the spark generator after the plasma is established.

The MPT system 100 of the present disclosure includes several primary components, including a microwave generator 102 (e.g., 6 GHz Microwave generator, model #Anritsu 68369B) along with an amplifier 104 (e.g., a Klystron amplifier (e.g., CPI K4C)) that drives the discharge at a specific frequency with a narrow bandwidth (e.g., 6.425 GHz operating frequency). This frequency is commonly used for satellite communications, thus making such high power microwave sources commercially feasible. This microwave source may have a rated and measured power of 3 kW. The primary working gas used in generating plasma, as discussed below, is dry air; however, other gases can also be used.

After the microwave generator 102 and the amplifier 104, a circulator 106, e.g., high-power 5.8-6.7 GHz 25 dB isolation 4-port circulator in CPR137F, is disposed in the path of the generated and amplified microwave. The circulator 106 has three ports. Port 1 (input port) receives the amplified microwave from the amplifier 104, port 2 (exit port) allows the microwave to exit the circulator 106. Any reflected power re-entering port 2 is routed to port 3 which is coupled to a black-body power dump 108 without routing to port 1 and thus no reflected power enters the amplifier 104 or the microwave generator 102. This air-cooled black-body power dump 108 handles an average power of about 2 kW with a peak power rating of up to 100 kW which is based on surface area and thus maximum heat transfer capability. The circulator 106 provides the amplifier 104 with an isolation having a bandwidth, e.g., 23 dB, from any remaining reflected power.

A bidirectional coupler 110, e.g., a WR137 directional coupler, is positioned after the circulator 106 and is used to monitor the magnitudes of forward and reflected powers. The bidirectional coupler 110 measures power of forward (and desired) microwave, as well as the reflected (and undesired) microwave. Other devices may be implemented instead of the bidirectional coupler 110 for measuring the reflected microwave. For example, temperature of the black-body power dump 108 ascertained by a digital temperature reader (not shown) can be used to estimate the amount of reflected microwave being dumped into the black-body power dump 108. Regardless of how the reflected microwave is measured, the next component in the circuit is a tuner 112, e.g., a CMR137 3-stub tuner. The tuner 112, includes a multi-tuning ports (e.g., 3 ports). Each port may be manually dropped into the tuner 112 augmenting the tuning of the tuner 112. The manner by which each port is dropped into the tuner may be manual or by a motor $\mathbf{114}_1$ . . . $\mathbf{114}_n$, e.g., a discrete stepper motor, and a screw attached thereto and controlled by a processor. By adjusting the position of each port in the tuner 112, the amount of reflected microwave may be varied. The goal is to reach a global minimum of reflected power.

Adjustment of tuner 112 is conducted while continually monitoring the directional coupler 110 readings and is continued until reflected power is minimized. Thus, an automatic tuning system can be implemented which is configured to receive a signal from the directional coupler 110 to continually adjust the tuning until minimum amount of reflection below a desired threshold is achieved. This manual or automatic adjustment may be in concert with a sliding short, discussed below, which can be rectilinearly adjusted manually or by a motor and a screw under the control of the automatic tuning system operated by a processor executing software held in a non-transient memory, to further adjust for reflected power. A coupler 113 is also shown in FIG. 2 which allows coupling of the tuner 112 at a first angle to a waveguide 116 at a second angle.

The next component is the waveguide 116 which allows microwave to be passed to a position of the waveguide which includes a hole that is where a jet of the gas, e.g., air, passes through. The waveguide 116 interfaces with a plenum 117 in which high pressure gas is brought to a swirl, which can be done by injecting two streams of gas tangentially from a gas tank 124 but in opposite directions as shown in FIG. 1, and one stream of gas introduced axially from a gas tank 126, as shown. Alternatively, the plenum may include a swirling pathway for gas where only two tangentially flow streams are needed from only one gas tank to cause proper swirling of gas. The gas is ignited into plasma 118 by an initial use of a spark generator 120 generating a spark 122. As discussed above, once the plasma 118 is established, the spark generator 120 may be removed, manually or automatically, and placed outside of the plasma 118. The plasma exits from a hole 121 out of the waveguide 116.

The waveguide 116 also includes a plate 128 at a distal end of waveguide 116 which is coupled to a moving arrangement, e.g., a screw 130 and a motor 132, collectively known as a sliding short 134. The motor 132 can be replaced by a manual operation by manually turning the screw 130 clockwise or counter-clockwise. Whether in an automatic (i.e., a processor activating the motor) or manual mode, turning the screw results in rectilinear movement of the plate 128 inside the waveguide 116. Doing so, results in changing the waveguide characteristics resulting in a change in reflected microwave. Consequently, the sliding short 134 is a mechanism provided for shorting wall at quarter-wavelength from the central axis of the waveguide 116.

Figure 3A:
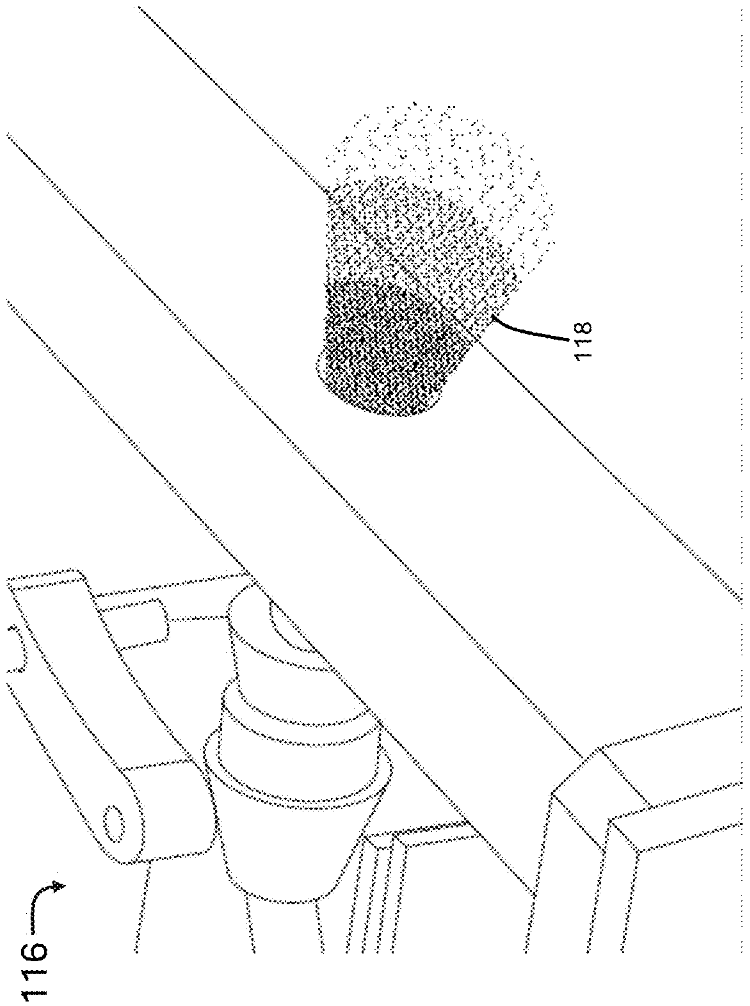
FIGS. 3A, 3B, and 3C are close-up schematics of the discharge section provided to depict the formation of the plasma and release to the atmosphere.
Figure 3B:
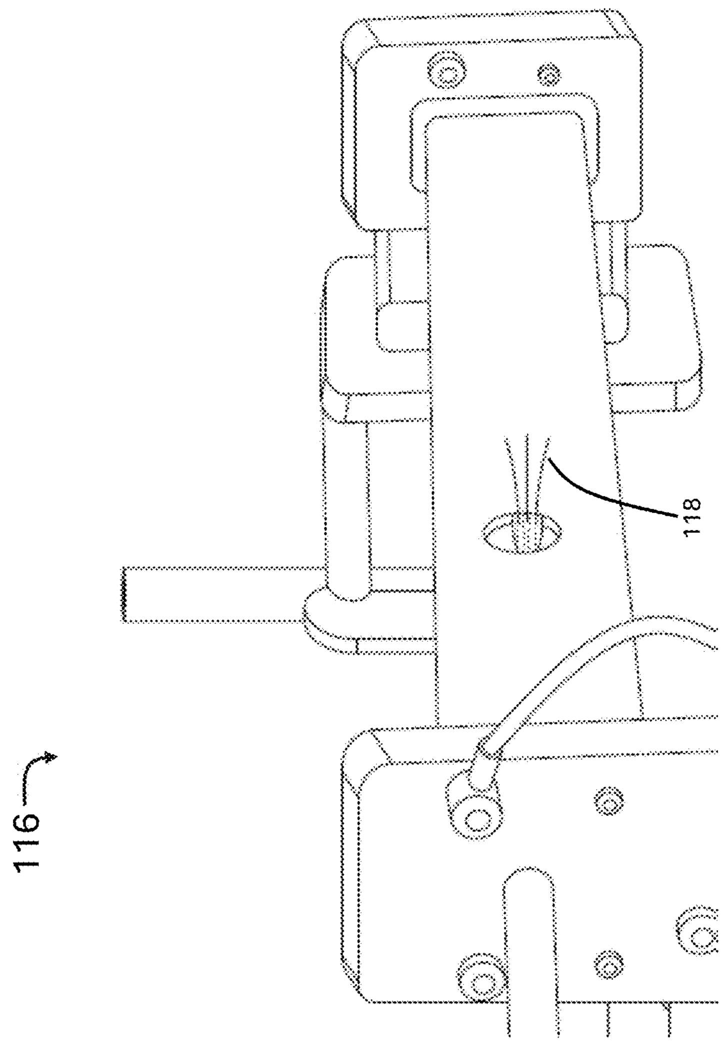
Figure 3C:
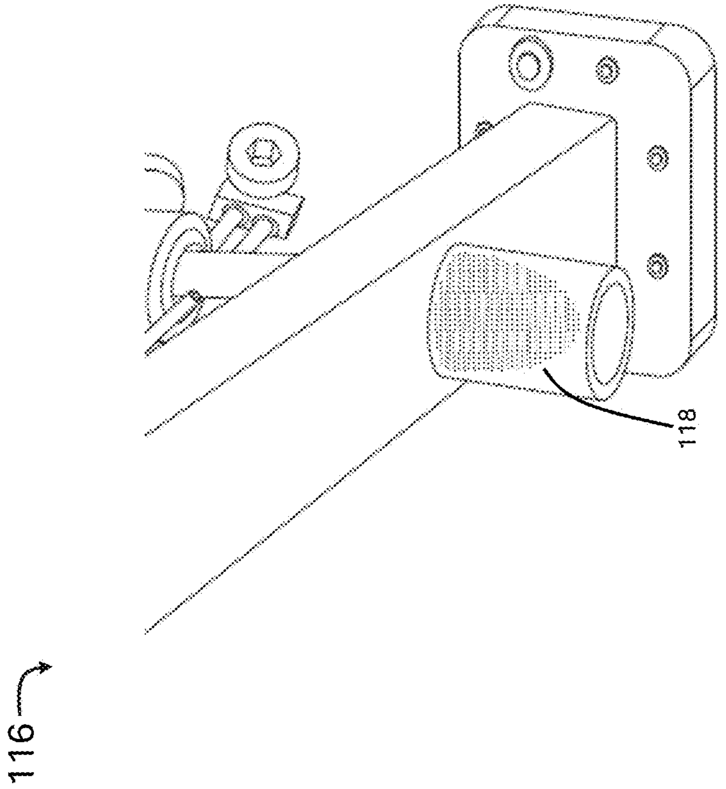

Referring to FIGS. 3A, 3B, and 3C, close-up schematics of the discharge section are provided to depict the formation of the plasma and release to the atmosphere.

As discussed above, there are a number of variables that can be adjusted in order to minimize the reflected microwave in the system 100. One or more such variables are seen in the tuner 112. For example, the tuner 112 may be a three-stub tuner, each stub controllable by a motor $\mathbf{114}_1$ . . . $\mathbf{114}_3$ (shown as $\mathbf{114}_n$). Additionally, the processor may be configured to control the motor 132 to affect the position of the plate 128. All these adjustments are to minimize the amount of reflected microwave in the system 100, shown as dotted arrows. The processor receives inputs from bidirectional coupler 110 or as discussed above from other arrangements such as temperature sensing of the black-body power dump 108 to determine the amount of reflected microwave. The processor executing software held in a non-transitory memory uses a an algorithm such as mean squared error optimization to minimize the reflected microwave. For example, the reflected microwave power can be used as an error signal to be minimized. The mean squared error algorithm as an example can be applied by a person having ordinary skill in the art for the processor to adjust position of the one or more stubs in the tuner 112, or by adjusting the plate 128 by operating the motor 132. The goal of this optimization process is to reach a global minimum for the reflected microwave power.

Those having ordinary skill in the art will recognize that numerous modifications can be made to the specific implementations described above. The implementations should not be limited to the particular limitations described. Other implementations may be possible.

The invention claimed is:

1. A microwave plasma torch (MPT) systems, comprising:

a microwave generator configured to generate microwave at a predetermined wavelength into a waveguide;

a circulator coupled to the microwave generator and configured to route reflected power in the waveguide away from the microwave generator;

a tuner coupled to the circulator and based on a signal representing reflected power in the waveguide configured to reduce the reflected power;

a torch section having an igniter and a gas inlet and configured to release plasma; and a sliding short terminating the waveguide and configured to affect the reflected power within the waveguide.

2. The MPT system of claim 1, wherein the microwave generator includes an amplifier configured to amplify the generated microwave at the predetermined wavelength.

3. The MPT system of claim 2, wherein the circulator is a three port component, with: i) a first port configured to receive the generated and amplified microwave; ii) a second port configured to release the generated and amplified microwave; and iii) a third port configured to route any reflected power received by the second port away from the first port.

4. The MPT system of claim 3, wherein the third port is coupled to a power dump.

5. The MPT system of claim 4, wherein the power dump is a black body.

6. The MPT system of claim 1, wherein the tuner is a three-stub tuner.

7. The MPT system of claim 1, wherein the tuner is configured to be controlled with an automatic tuning system configured to receive a signal from a directional coupler disposed between the tuner and the circulator, the signal representing the reflected power in the waveguide.

8. The MPT system of claim 7, wherein the automatic tuning system tunes the tuner in concert with rectilinearly moving the sliding short via a translational arrangement.

9. The MPT system of claim 8, wherein the translational arrangement includes a motor and a screw.

10. The MPT system of claim 1, wherein gas introduced into the torch section from the gas inlet is air.

11. A method of generating microwave-based plasma using a microwave plasma torch (MPT) systems, comprising:

generating microwave by a microwave generator configured to generate microwave at a predetermined wavelength into a waveguide;

routing reflected power in the waveguide away from the microwave generator with a circulator coupled to the microwave generator;

tuning microwave within the waveguide with a tuner coupled to the circulator based on a signal representing reflected power in the waveguide, wherein the tuner is configured to reduce the reflected power;

releasing plasma to atmosphere from a torch section having an igniter and a gas inlet; and affecting the reflected power within the waveguide with a sliding short terminating the waveguide.

12. The method of claim 11, further comprising amplifying the generated microwave with an amplifier configured to amplify the generated microwave at the predetermined wavelength.

13. The method of claim 12, wherein the circulator is a three port component, with: i) a first port configured to receive the generated and amplified microwave; ii) a second port configured to release the generated and amplified microwave; and iii) a third port configured to route any reflected power received by the second port away from the first port.

14. The method of claim 13, wherein the third port is coupled to a power dump.

15. The method of claim 14, wherein the power dump is a black body.

16. The method of claim 11, wherein the tuner is a three-stub tuner.

17. The method of claim 11, wherein the tuner is configured to be controlled with an automatic tuning system configured to receive a signal from a directional coupler disposed between the tuner and the circulator, the signal representing the reflected power in the waveguide.

18. The method of claim 17, wherein the automatic tuning system tunes the tuner in concert with rectilinearly moving the sliding short via a translational arrangement.

19. The method of claim 18, wherein the translational arrangement includes a motor and a screw.

20. The method of claim 11, wherein gas introduced into the torch section from the gas inlet is air.

* * * * *